United States Patent [19]

DeAntonis et al.

[11] Patent Number: 5,055,355
[45] Date of Patent: Oct. 8, 1991

[54] ORIENTED FILM LAMINATES OF POLYAMIDES AND ETHYLENE VINYL ALCOHOL COPOLYMERS

[75] Inventors: Ferdinand A. DeAntonis, Fogelsville; William H. Murrell, Orwigsburg; Alfieri Degrassi, Pottsville, all of Pa.

[73] Assignee: Allied-Signal Inc., Morris Township, Morris County, N.J.

[21] Appl. No.: 256,189

[22] Filed: Oct. 7, 1988

Related U.S. Application Data

[63] Continuation of Ser. No. 727,205, Apr. 29, 1985, abandoned, which is a continuation of Ser. No. 518,983, Aug. 1, 1983, abandoned.

[51] Int. Cl.$^5$ .............................................. B32B 27/08
[52] U.S. Cl. ................................ 428/476.3; 428/475.8
[58] Field of Search ............... 428/475.5, 476.1, 476.3, 428/474.4, 475.8, 500, 523

[56] References Cited

U.S. PATENT DOCUMENTS

| | | | |
|---|---|---|---|
| 3,595,740 | 7/1971 | Gerow | 428/483 |
| 3,652,759 | 3/1972 | Schlemmer et al. | 264/290.2 |
| 3,949,114 | 4/1976 | Viola et al. | 428/337 |
| 4,082,854 | 4/1978 | Yamada et al. | 428/476.1 |
| 4,164,529 | 8/1979 | Fujita et al. | 264/290.2 |
| 4,254,169 | 3/1981 | Schroeder | 428/35 |
| 4,284,674 | 8/1981 | Sheptak | 428/475.5 |
| 4,294,935 | 10/1981 | Kodera et al. | 264/290.2 |
| 4,355,721 | 10/1982 | Knott, II et al. | 428/475.8 |
| 4,362,585 | 12/1982 | DeAntonis et al. | 156/62.2 |
| 4,399,180 | 4/1982 | Briggs et al. | 428/212 |
| 4,399,181 | 11/1981 | Yoshimura et al. | 428/213 |
| 4,405,667 | 9/1983 | Christensen et al. | 428/476.1 |
| 4,407,873 | 10/1983 | Christensen et al. | 428/476.1 |
| 4,409,286 | 10/1983 | Decroix | 428/332 |
| 4,468,427 | 8/1984 | Degrassi et al. | 428/476.3 X |
| 4,472,330 | 9/1984 | Ashcraft | 156/244.24 X |
| 4,472,485 | 9/1984 | Tabuse et al. | 428/476.3 X |
| 4,501,797 | 2/1985 | Super et al. | 428/349 |
| 4,501,798 | 2/1985 | Koshak et al. | 428/475.8 |

FOREIGN PATENT DOCUMENTS

| | | |
|---|---|---|
| 0063006 | of 0000 | European Pat. Off. |
| 0063006 | 10/1982 | European Pat. Off. ......... 428/476.3 |
| 56-27347 | of 0000 | Japan . |
| 55-93449 | of 0000 | Japan . |
| 52-115880 | of 0000 | Japan . |
| 57-159622 | of 0000 | Japan . |

OTHER PUBLICATIONS

Proc. of the Sec. Annual Intl. Conf. on Coextrusion Markets and Tech., COEX'82, Nov. 3–5, 1982, Princeton, N.J.

Primary Examiner—James J. Seidleck
Attorney, Agent, or Firm—Roger H. Criss

[57] ABSTRACT

The present invention is a film laminate comprising a polyamide layer, preferably polyepsiloncaprolactam, and a layer of ethylene vinyl alcohol copolymer. The polyamide layer and ethylene vinyl alcohol copolymer layer are preferably adjacent layers. The laminate is expanded to an area of less than 4 times the original area. Preferably, the laminate is drawn to a draw ratio of from 1.5:1 to 4:1 in at least one direction. Preferred laminates have outer layers of polyepsiloncaprolactam and at least one inner layer of ethylene vinyl alcohol copolymer adjacent to at least one layer of polyepsiloncaprolactam. Preferably, the laminate is a multilayer coextrusion.

8 Claims, No Drawings

ORIENTED FILM LAMINATES OF POLYAMIDES AND ETHYLENE VINYL ALCOHOL COPOLYMERS

This application is a continuation of application Ser. No. 727,205 filed Apr. 29, 1985, which is a continuation of Ser. No. 518,983 filed Aug. 1, 1983.

BACKGROUND OF THE INVENTION

The present invention is in the field of film laminates; more particularly, the invention relates to oriented film laminates of polyamides and ethylene vinyl alcohol copolymers.

Laminates containing at least one layer of ethylene vinyl alcohol copolymer and at least one polyamide, usually polyepsiloncaprolactam, layers of ethylene vinyl alcohol are disclosed in U.S. Pat. Nos. 3,595,740; 3,949,114; 4,254,169; and 4,284,674. The ethylene vinyl alcohol copolymer layer provides a barrier to oxygen permeability. Polyamides are used for physical property improvement, chemical resistance, and act as a barrier to gas permeability.

U.S. Pat. No. 4,294,935 discloses that a film of ethylene vinyl alcohol copolymer has improved gas barrier characteristics when expanded to an area from 4 to 20 times the original area.

SUMMARY OF THE INVENTION

The present invention is a film laminate comprising a polyamide layer, preferably polyepsiloncaprolactam, and a layer of ethylene vinyl alcohol copolymer. The polyamide layer and ethylene vinyl alcohol copolymer layer are preferably adjacent layers. The laminate is expanded to an area of up to less than 4 times the original area. Preferably, the laminate is drawn to a draw ratio of from 1.5:1 to 4:1 in at least one direction. Preferred laminates have outer layers of polyepsiloncaprolactam and at least one inner layer of ethylene vinyl alcohol copolymer adjacent to at least one layer of polyepsiloncaprolactam. Preferably, the laminate is a multilayer coextrusion.

The present invention also includes a method of improving the barrier properties of a film laminate comprising at least one layer of polyamide and at least one layer of ethylene vinyl alcohol copolymer. The method comprises the step of expanding the area of the laminate up to less than 4 times the original area. Preferably, the laminate is drawn to a draw ratio of from 1.5:1 to 4:1 in at least one direction. The preferred laminating method is by coextrusion.

DESCRIPTION OF THE PREFERRED EMBODIMENTS

The present invention is a film laminate comprising a polyamide layer and at least one layer of ethylene vinyl alcohol copolymer. The polyamide is preferably adjacent to the ethylene vinyl alcohol copolymer. The laminate is expanded to an area of up to 4 times the original area. Preferably the laminate is drawn to a draw ratio of 1.5:1 in least one direction.

The degree of orientation or drawing of the film laminate of the present invention is characterized by the draw ratio. For the purposes of the present invention the term draw ratio is an indication of the increase in the dimension in the direction of draw. Therefore the film laminate having a draw ratio of 2:1 has its length doubled during the drawing or orientation process. Preferably, in the present invention the film laminate is drawn to a draw ratio of from 1.5:1 to 4:1 in at least one direction. The film laminate of the present invention can be biaxially oriented. The film laminate increases in area upon being drawn. The expansion of area is an indication of how much the film has been stretched. The film laminate of the present invention can be stretched so that the area of the film has expanded to less then 4 times. This results in dramatic improvements in barrier properties, as indicated by the examples.

As discussed below the film laminate of the present invention can be formed by various processes including coextrusion and extrusion lamination. The preferred film laminate is formed by coextrusion.

The preferred structure of the film laminate of the present invention is one in which there is at least one layer of ethylene vinyl alcohol copolymer adjacent to at least one layer of polyamide, preferably polyepsiloncaprolactam. Structures which are particularly preferred are balanced or symmetrical structures to prevent curling of the film. Such structures include at least one core layer of ethylene vinyl alcohol copolymer sandwiched between outer layers of polyamide. Other laminates include an outer layer of polyepsiloncaprolactam adjacent to a first inner layer of ethylene vinyl alcohol copolymer, the opposite side of which is adjacent to a polyepsiloncaprolactam layer which is adjacent to a second layer of ethylene vinyl alcohol copolymer, the opposite of which is adjacent to an outer layer of polyepsiloncaprolactam. The laminates of the present invention can include other polymeric film layers, and adhesives.

Polyamides suitable for use in the present invention include polyamides which are film forming. Preferred polyamides are long chain polymeric amides having recurring amide groups as part of the polymer backbone and preferably a relative formic acid viscosity of from about 40 to about 250 measured in 90 percent formic acid at a concentration of 9.2 weight percent.

Non-limiting examples of such polyamides are:

a) those prepared by the polymerization of lactams, preferably epsilon-caprolactam (nylon 6);

b) those prepared by the condensation of a diamine with a dibasic acid, preferably the condensation of hexamethylene diamine with adipic acid (nylon 6,6) and the condensation of hexamethylene diamine with sebacic acid (nylon 6,10);

c) those prepared by self-condensation of amino acids, preferably self-condensation of 11-aminoundecanoic acid (nylon 11); and d) those based on polymerized vegetable oil acids, or random, block, or graph interpolymers consisting of two or more of these polyamides. Preferred polyamides are polyepsiloncaprolactam, polyhexymethylene adipamide, and a copolymer of polyepsiloncaprolactam and polyhexamethylene adipamide.

Also suitable for use herein are polyamide interpolymers comprised of a polyamide and one or more comonomers. Non limiting examples of such comonomers include acrylic or methyacrylic acid and/or their derivatives, such as acrylonitrile, acrylamide, methyls, ethyls, propyl, butyl, 2-ethylhexyl, dexyl and tridecylesters of acrylic or methyacrylic acid, vinyl esters such as vinyl acetate and vinyl propionate, vinyl aromatic compounds such as styrene, alpha-methyl styrene, and vinyl toluenes and vinyl ethers such as vinyl isobutyl ether.

It is further noted that the aforementioned polyamides containing various terminal functionality are also suitable for use in the present invention. Preferred are polycaprolactams (nylon 6) containing, a) chain, b) a carboxyl group attached to one end and an acetamide group attached to the other end of the polymer chain, c) an amino group attached to both ends of the polymer chain and d) a carboxyl group attached to one end and an amino group attached to the other end of the polymer chain. Particularly preferred is d) above, a polycaprolactam having a carboxyl group attached to one end and an amino group attached to the other end of the polymer chain.

The nylon of the present invention may be modified by one or more conventional additives such as stabilizers and inhibitors of oxidative, thermal, and ultraviolet light degradation; lubricants, plasticizers and mold release agents including dyes from pigments.

Copolymers of ethylene and vinyl alcohol suitable for use in the present invention can be prepared by the methods disclosed in U.S. Pat. Nos. 3,510,464; 3,560,461; 3,847,845; and 3,585,177.

The ethylene vinyl alcohol copolymer can be hydrolyzed ethylene vinyl acetate copolymer. The degree of hydrolysis can range from 85 to 99.5%. The ethylene vinyl alcohol copolymer preferably contains from 15 to 65 mol percent ethylene and more preferably 25 to 50 mol percent ethylene. Copolymers of lower than 15 mol percent ethylene tend to be difficult to extrude while those above 65 mol percent ethylene have reduced oxygen barrier performance, U.S. Pat. No. 3,595,740.

Useful ethylene vinyl alcohol copolymers suitable for the present invention are commercially available from Kuraray of Japan. Kuraray of Japan produces an ethylene vinyl alcohol copolymer under the designation "EP-E" which has 32 to 36% ethylene, a number average molecular weight of about 29,500 and melting point of 324° F. Other manufacturers produce suitable ethylene vinyl alcohol copolymers. One suitable copolymer has about 29% ethylene, a number average molecular weight of about number average 22,000 and a melting point of 356° F. Another described in U.S. Pat. No. 4,252,169 has 40% ethylene, a number average molecular weight of about 26,000 and a melting point of 327° F. The number average molecular weight can be measured by osmometry.

In addition to having at least one layer of polyamide adjacent to at least one layer of ethylene vinyl alcohol copolymer the film laminate of the present invention can include laminates and other polymeric film layers. Included in the other polymer film layers are polyolefins and polyolefin copolymers including ionic copolymers. Adhesive layers include modified polyolefins. Non-limiting examples of other polymeric layers and adhesives which can be used in the film laminate of the present invention are disclosed in U.S. Pat. Nos. 4,058,647 and 4,254,169 both hereby incorporated by reference.

The present invention also includes an expanded film made of a blend of polyamide and ethylene vinyl alcohol copolymer.

The polymer blend can also be included as a layer in a film laminate. The laminate can include a layer of the blend and a layer of polyamides and/or a layer of ethylene vinyl alcohol copolymer. The blend can comprise from 1 to 99 and preferably 40 to 90 percent by weight of the polymers of polyamide. The blend of the polyamide and ethylene vinyl alcohol copolymer can be interposed between layers of polyamide and ethylene vinyl alcohol copolymer. It is recognized that the blend can include other compatible polymers.

The present invention includes a method of improving the barrier properties of a film laminate comprising at least one layer of a polyamide and at least one layer of ethylene vinyl alcohol copolymer. The polyamide layer and ethylene vinyl alcohol layer are preferably adjacent layers. The method comprises a step of expanding the area of the laminate up to less the 4 times the original area. Preferably the film laminate is oriented to a draw ratio of from 1.5:1 to 4:1 in at least one direction. Preferred orientations include monoaxially oriented film laminates and biaxially oriented film laminates.

In a preferred method for improving the barrier properties of the film laminate at least one layer of polyamide is laminated adjacent to at least one layer of ethylene vinyl alcohol copolymer and the laminate is then oriented in at least one direction. The film laminate can be formed by suitable laminating techniques including extrusion lamination and coextrusion. In the most preferred method the laminating is conducted by coextrusion. Processes of coextrusion to form film and sheet laminates are generally known as indicated in, "Modern Plastics Encyclopedia", Vol. 56, No. 10A, pp. 131–132, McGraw Hill, October, 1979. Coextruded sheet and film are made using multimanifold dies such as a multimanifold circular die for bubble blown film or coextrusion feed block combined with a flat die for cast film. The article "Trends & Equipment . . . Co-extrusion" by M. H. Naitove in Plastics Technology, February, 1977, pp. 61–71, discusses co-extrusion in further detail. These articles are hereby incorporated by reference.

As indicated above it is preferred to orient the film laminate after forming the laminate. The film laminate of the present invention has been found to be able to be oriented without delaminating or fibrillating. The film can be oriented in at least one direction. Preferred methods of orientation of the film laminate include monoaxial and biaxial orientation. The orientation can be conducted by methods known in the art. Generally, monoaxially oriented film is prepared by passing the film over a series of preheating and heating rolls. The heated film laminate moves through a set of nip rolls down stream at a faster rate than the film entering the nip rolls at an upstream location. The change of rate is compensated for by stretching in the film laminate. Typical process and range of conditions for monoaxially oriented polyamide film are disclosed in U.S. Pat. No. 4,362,585 hereby incorporated by reference. The film laminate of the present invention can be biaxially oriented using blown tube apparatus, or a tenter frame apparatus. The film laminate of the present invention can be embossed after orientation.

The film laminate of the present invention having at least one polyamide layer and at least one layer of ethylene vinyl alcohol copolymer has been found to have improved gas, particularly oxygen, barrier properties contributed by the layers of polyamide and ethylene vinyl alcohol than would be expected from separate films of oriented polyamide and oriented ethylene vinyl alcohol copolymer.

Several examples are set forth below to illustrate the nature of the invention and the manner of carrying it out. However, the invention should not be considered to be limited to the details thereof.

EXAMPLE

A co-extruded laminate was made from polyepsiloncaprolactam and ethylene vinyl alcohol. The polyepsiloncaprolactam polymer used had a relative formic acid viscosity of 73 measured in 90% formic acid and a 9.2% concentration by weight. The ethylene vinyl alcohol was Kuraray type "F" (Grade EP-F) produced by Kuraray of Japan. The ethylene vinyl alcohol was in pellet form and had a melt index of 1.5 g per 10 minutes as measured on the ASTM Test No. 1238 at a load of 2160 g at 190° C. The ethylene vinyl alcohol copolymer contains 67 mol percent vinyl alcohol and had a glass transition temperature of 69° C. The ethylene vinyl alcohol copolymer and the polyepsiloncaprolactam were co-extruded to form a co-extruded film laminate. The polyepsiloncaprolactam was extruded through a 2½ inch diameter Davis Standard Extruder having a temperature profile of Zone 1—450° F., Zone 2—465° F., Zone 3—480° F., Zone 4—485° F., Zone 5—480° F. and adapter Zone 1—490° F. The extruder operated with a screw speed of 35 rpm, a motor drive 28 amps, a barrel pressure of 1000 psig, the melt temperature of the nylon at 480° F., and an extruder output of 60 pounds per hour.

The ethylene vinyl alcohol copolymer was extruded through a 1¾ inch diameter Reifenhauser Extruder. The extruder had a temperature profile which included Zone 1—300° F., Zone 2—450° F., Zone 3—450° F., Zone 4—445° F., and an adaptor Zone 1—435° F. The operating conditions of the extruder included a screw speed of 30 rpm, a motor drive amperage of 8 amps, a melt temperature of 461° F., and an extruder output of 16 pounds per hour.

The extrudate from the three extruders was put through a feed block coextrusion adaptor manufactured by the Johnson Plastic Corporation and operating at an adaptor temperature of Zone 1—480° F., and Zone 2—480° F. The flat cast die temperatures were operated at 480° F. The coextruder film was then cast on a roll at 195° F., followed by a cooling roll at 145° F., and an additional roll at 200° F. The total extrusion output was 76 pounds per hour.

The film was oriented monoaxially. The film was passed over a preheated roll at 202° F., to a slow stretch roll at 205° F., to a fast stretch roll at 240° F., to a heat set roll at 265° F., and finally to a cooling roll at 190° F. The line speed was 95 feet per minute and the draw ratio was 3.2:1.

The film laminate was tested for oxygen permeability using the Ox-Tran 10/50. The Ox-Tran 10/50 cell was manufactured by Modern Controls, Inc., Elk River, MN and operated at 24° C. The procedure used was that disclosed in ASTM D-3985. The oxygen permeability was measured in cubic centimeters per 100 inch square per 24 hours per Atm at 24° C. The oriented film had a gauge of 0.68 mils.

The oxygen permeation of the oriented film of the present invention was compared to the oxygen permeation for a film of the above-described polyepsiloncaprolactam which was coated with polyvinylidene chloride which is an oxygen barrier. This film had a total gauge of 0.85 mils with the polyvinylidene chloride having a gauge of 0.18 mils.

A second comparative was made using a film of polyepsiloncaprolactam of the type described above which was monoaxially drawn to a draw ratio of 3.2:1. The oriented film was coated with polyvinylidene chloride as an oxygen barrier. The film had a total gauge of 0.65 mils of which 0.18 mils was polyvinyldene chloride.

The oxygen permeation data is summarized on the Table below with $O_2TR$ being the oxygen transmission rate.

TABLE

| | | Gauge (mils) | $O_2TR$ (0% RH) | $O_2TR$ (100% RH) |
|---|---|---|---|---|
| Ex. | Oriented Nylon/EVOH | 0.53/0.15 | 0.07 | 0.29 |
| Comp. 1 | (Amorphous Nylon)/PVDC | 0.67/0.18 | 0.42 | 2.11 |
| Comp. 2 | (Oriented Nylon)/PVDC | 0.47/0.18 | 0.48 | 1.04 |

While exemplary embodiments of the invention have been described, the true scope of the invention is to be determined from the following claims:

What is claimed is:

1. A film laminate consisting essentially of a polyamide layer and a layer of ethylene vinyl alcohol copolymer having 15 to 65 mol percent ethylene and a degree of hydrolysis of from 85 to 99.5%, wherein the ethylene vinyl alcohol copolymer layer is adjacent to the polyamide layer and the laminate is drawn to a draw ratio of from 1.5:1 to 4:1 in at least one direction.

2. A film laminate as recited in claim 1 wherein the ethylene vinyl alcohol copolymer has a number average molecular weight of from about 22,000 to about 29,500.

3. A film laminate consisting essentially of a layer of ethylene vinyl alcohol copolymer having 15 to 65 mol percent ethylene and a degree of hydrolysis of from 85 to 99.5% and being sandwiched between two adjacent layers of polyamide, the laminate being drawn to a draw ratio of from 1.5:1 to 4:1 in at least one direction.

4. The film laminate as recited in claim 3 wherein the polyamide is polyepsiloncaprolactam.

5. The film laminate as recited in claim 3 wherein the laminate is a coextruded laminate.

6. The film laminate as recited in claim 3 wherein the film laminate is embossed.

7. The film laminate as recited in claim 1 wherein the polyamide is polyepsiloncaprolactam.

8. A film laminate comprising a layer of polyepsiloncaprolactam adjacent to a layer of ethylene vinyl alcohol copolymer, said copolymer containing 67 mol percent vinyl alcohol, wherein said laminate is monoaxially drawn to a draw ratio of 3:2.

* * * * *